(12) United States Patent
Xu et al.

(10) Patent No.: US 12,243,328 B2
(45) Date of Patent: Mar. 4, 2025

(54) SCALABLE ROAD SIGN INTERPRETATION SYSTEM FOR AUTONOMOUS DRIVING

(71) Applicant: GM Global Technology Operations LLC, Detroit, MI (US)

(72) Inventors: Jiejun Xu, Diamond Bar, CA (US); Kenji Yamada, Los Angeles, CA (US); Michael J. Daily, Thousand Oaks, CA (US); Alireza Esna Ashari Esfahani, Novi, MI (US); Hyukseong Kwon, Thousand Oaks, CA (US); Darren Michael Chan, Thousand Oaks, CA (US); Alan Perry, Canoga Park, CA (US); Joshua Lampkins, Los Angeles, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 348 days.

(21) Appl. No.: 17/820,317

(22) Filed: Aug. 17, 2022

(65) Prior Publication Data

US 2024/0062555 A1 Feb. 22, 2024

(51) Int. Cl.
*G06V 20/58* (2022.01)
*G06N 3/045* (2023.01)
(Continued)

(52) U.S. Cl.
CPC ........... *G06V 20/582* (2022.01); *G06N 3/045* (2023.01); *G06V 10/82* (2022.01); *G06V 20/63* (2022.01); *G06V 30/274* (2022.01)

(58) Field of Classification Search
None
See application file for complete search history.

(56) References Cited

U.S. PATENT DOCUMENTS 11,380,110 B1 * 7/2022 Ben Yaacov ........... G06V 10/82
12,087,062 B1 * 9/2024 Esna Ashari Esfahani ................. B60W 30/18163

(Continued)

OTHER PUBLICATIONS

Baek, et al., "What Is Wrong With Scene Text Recognition Model Comparisons? Dataset and Model Analysis," 2019 IEEE/CVF International Conference on Computer Vision (ICCV), 2019, pp. 4715-4723, doi: 10.1109/ICCV.2019.00481.

(Continued)

*Primary Examiner* — Tahmina N Ansari
(74) *Attorney, Agent, or Firm* — Vivacqua Crane, PLLC

(57) ABSTRACT

A road sign interpretation system includes a front-facing camera mounted on or in a vehicle collecting image data of multiple road signs. A first convolutional neural network (CNN) receives the image data from the front-facing camera and yields a set of sign predictions including one or more sign text instances. A second CNN defining a text extractor receives the image data from the front-facing camera and extracts text candidates including the multiple sign text instances. Sign and sign data localization is provided in the second CNN to compute a text order from the multiple sign text instances. A sign text synthesizer module receives individual sign text instances from the first CNN and individual ones of the sign text instances in digitized forms from an optical character recognizer (OCR). A semantic encoding and interpretation module receives the sign text instances and identifies semantics of the multiple road signs.

13 Claims, 6 Drawing Sheets

(51) Int. Cl.
  *G06V 10/82* (2022.01)
  *G06V 20/62* (2022.01)
  *G06V 30/262* (2022.01)

(56) References Cited

U.S. PATENT DOCUMENTS

| | | | | |
|---|---|---|---|---|
| 2016/0012465 A1* | 1/2016 | Sharp | G06Q 20/321 | 705/14.17 |
| 2020/0151942 A1* | 5/2020 | Guo | G06T 5/50 | |
| 2022/0067405 A1* | 3/2022 | Kim | G06V 10/82 | |
| 2022/0219708 A1* | 7/2022 | Chakravarty | G06T 17/10 | |
| 2023/0169779 A1* | 6/2023 | Nessler | G01C 21/30 | 701/409 |
| 2023/0196619 A1* | 6/2023 | Williams | G06T 7/80 | 348/121 |
| 2023/0401274 A1* | 12/2023 | Denninghoff | G06Q 30/0251 | |

OTHER PUBLICATIONS

Busta, et al, "Deep TextSpotter: An End-to-End Trainable Scene Text Localization and Recognition Framework," 2017 IEEE International Conference on Computer Vision (ICCV), 2017, pp. 2223-2231, doi: 10.1109/ICCV.2017.242.

Cer, et al., "Universal Sentence Encoder," 2018, arXiv:1803.11175v2 [cs.CL].

Dijkstra, "A Note on Two Problems in Connexion with Graphs," Numer. Math. 1,1959, pp. 269-271, https://doi.org/10.1007/BF01386390.

Dosovitskiy, et al., "CARLA: An Open Urban Driving Simulator," 2017, pp. 1-16, arXiv:1711.03938 [cs.LG].

Girshick, et al. "Rich Feature Hierarchies for Accurate Object Detection and Semantic Segmentation," 2014 IEEE Conference on Computer Vision and Pattern Recognition, 2014, pp. 580-587, doi: 10.1109/CVPR.2014.81.

Jurafsky, et al., "Vector Semantic and Embeddings," Speech and Language Processing, An Introduction to Natural Language Processing, Computational Linguistics, and Speech Recognition, 2021, Chapter 6, pp. 102-132.

Liao, et al. "Real-Time Scene Text Detection with Differentiable Binarization" Proceedings of the AAAI Conference on Artificial Intelligence, Apr. 3, 2020, pp. 11474-11481, vol. 34. No. 07.

O'Shea, et al., "An Introduction to Convolutional Neural Networks," 2015, pp. 1-11, arXiv:1511.08458v2 [cs.NE].

Redmon, et al. "You Only Look Once: Unified, Real-Time Object Detection," 2016 IEEE Conference on Computer Vision and Pattern Recognition (CVPR), 2016, pp. 779-788, doi: 10.1109/CVPR.2016.91.

Schmidhuber, "Deep Learning in Neural Networks: An Overview," Neural Networks, 2015, pp. 85-117, vol. 61.

Van Der Maaten, et al., "Visualizing Data Using t-SNE,." Journal of Machine Learning Research 9, 2008, pp. 1-26.

* cited by examiner

SCALABLE ROAD SIGN INTERPRETATION SYSTEM FOR AUTONOMOUS DRIVING

INTRODUCTION

The present disclosure relates to vehicle road sign detection and interpretation systems.

State-of-the-art road sign detection and interpretation systems leverage deep convolutional neural networks (CNNs) and data-driven algorithms which learn to automatically parse images for signs, and assign their observations to a set of predefined categories. When applied to real-world autonomous driving, this approach can adequately detect common road signs for day-to-day driving, but this approach is inadequate in situations that are unexpected or uncommon, including but not limited to accident notification message boards and construction message boards. In real-world driving scenarios, this approach is fundamentally intractable because road signs can take on innumerable shapes and forms that cannot be accounted for in training.

While current road sign detection systems achieve their intended purpose, there is a need for a new and improved road sign interpretation system.

SUMMARY

According to several aspects, a road sign interpretation system includes a front-facing camera is mounted on or in a vehicle, the front-facing camera collecting image data of multiple road signs. First, a convolutional neural network (CNN) receives the image data from the front-facing camera and yields a set of sign predictions including one or more sign text instances. A second CNN defining a text extractor receives the image data from the front-facing camera and extracts text candidates including the multiple sign text instances. Sign and sign data localization is provided in the second CNN to compute a text order from the multiple sign text instances. A sign text synthesizer module receives individual sign text instances from the first CNN and individual ones of the sign text instances in a digitized form from an optical character recognizer (OCR). A semantic encoding and interpretation module receives the sign text instances and identifies high-level semantics of the multiple road signs.

In another aspect of the present disclosure, a character recognition algorithm is provided with the OCR, the character recognition algorithm converting the text order from the sign text instances into one or more machine-readable digitized forms.

In another aspect of the present disclosure, a planner and router module receives an output of the semantic encoding and interpretation module. A route plan is computed a planner portion which is received by a navigation router portion.

In another aspect of the present disclosure, an on-board computer receives the image data from the camera, in addition to data saved and retrieved from a memory of the on-board computer to perform road sign interpretation and to generate and display data results.

In another aspect of the present disclosure, images of common road signs are saved in and retrieved from the memory of the on-board computer, wherein the camera receives the image data which is compared to the images of the common road signs.

In another aspect of the present disclosure, an egocentric perspective defining objects visible to the vehicle as a first-person point of view is provided by the front-facing camera.

In another aspect of the present disclosure, the text extractor of the second CNN accepts entire ones of the images as input, and the second CNN is applied as a segmentation network.

In another aspect of the present disclosure, individual sign text instances identified by the OCR are constructed to form a model having a long short-term memory (LSTM) architecture to support an ordered sequence of outputs including characters into words.

In another aspect of the present disclosure, individual ones of the multiple sign text instances are configured in a logical reading order of the multiple sign text instances including left-to-right and top-to-bottom by operation of the sign text synthesizer module.

In another aspect of the present disclosure, a sentence encoder has individual ones of multiple sign text instances fed into the sentence encoder to obtain a numeric feature representation. A Universal Sentence Encoder (USE) or any other sentence encoder is leveraged to generate a fixed-length feature vector for a complete sentence. A distance metric is applied in a calculation performed to determine how close or distant a first point of any two of multiple text instances is from a second point of the any two of the multiple sign text instances.

According to several aspects, a method to interpret road signs comprises: collecting image data from a front-facing camera mounted on or in a vehicle including image data of multiple road signs; feeding the image data from the front-facing camera into a first convolutional neural network (CNN) to yield a set of sign predictions including one or more sign text instances, and in parallel feeding the image data from the front-facing camera into a second CNN defining a text extractor to extract text candidates including the multiple sign text instances; providing sign and sign data localization for the second CNN to compute a text order from the multiple sign text instances; transferring individual sign instances from the first CNN and individual ones of the sign text instances in digitized forms from an optical character recognizer (OCR) into a sign text synthesizer module; and feeding the sign text instances into a semantic encoding and interpretation module to identify high-level semantics of the multiple road signs.

In another aspect of the present disclosure, the method includes: forwarding an output of the semantic encoding and interpretation module to a planner; and operating the planner to compute a route plan and feeding the route plan to a navigation router.

In another aspect of the present disclosure, the method includes: recommending a route for the vehicle to take that optimizes travel time and distance for navigation using the navigation router and navigates the vehicle in case of an autonomous vehicle or communicates the route to a vehicle operator.

In another aspect of the present disclosure, the method includes detecting a generic shape of an exemplary sign and one or more sign text instances defining text tokens of the sign.

In another aspect of the present disclosure, the method includes evaluating text-sign membership including whether or not text lies within a bounding region of one of the sign text instances using the OCR.

In another aspect of the present disclosure, the method includes applying a character recognition algorithm of the OCR to convert a text order of the sign text instances into one or more digitized forms that are machine-readable.

In another aspect of the present disclosure, the method includes: encoding individual ones of the multiple sign text instances as fixed-dimension feature vectors using the semantic encoding and interpretation module; and the encoder classifying consisting of finding a closest matching sign of a category of signs, and assigning the text instance to the same category of the closest matching sign.

According to several aspects, a method to interpret road signs comprises: collecting image data from a front-facing camera mounted on or in a vehicle including image data of multiple road signs; feeding the image data from the front-facing camera into a first convolutional neural network (CNN) to yield a set of sign predictions including one or more sign instances, and in parallel feeding the image data from the front-facing camera into a second CNN defining a text extractor to extract text candidates including multiple text instances; providing sign and sign data localization for the second CNN to compute a text order from the multiple text instances; transferring individual sign instances from the first CNN and individual ones of the text instances in digitized forms from an optical character recognizer (OCR) into a sign text synthesizer module; and forwarding an output of a semantic encoding and interpretation module to a planner; and operating the planner to compute a route plan and feeding the route plan to a navigation router.

In another aspect of the present disclosure, the method includes feeding the text instances into a semantic encoding and interpretation module to identify high-level semantics of the multiple road signs.

In another aspect of the present disclosure, the method includes: recommending a route for the vehicle to take that optimizes travel time and distance for navigation using the navigation router; and communicating the route to a map which identifies and presents the route with updated path constraints to a vehicle operator.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
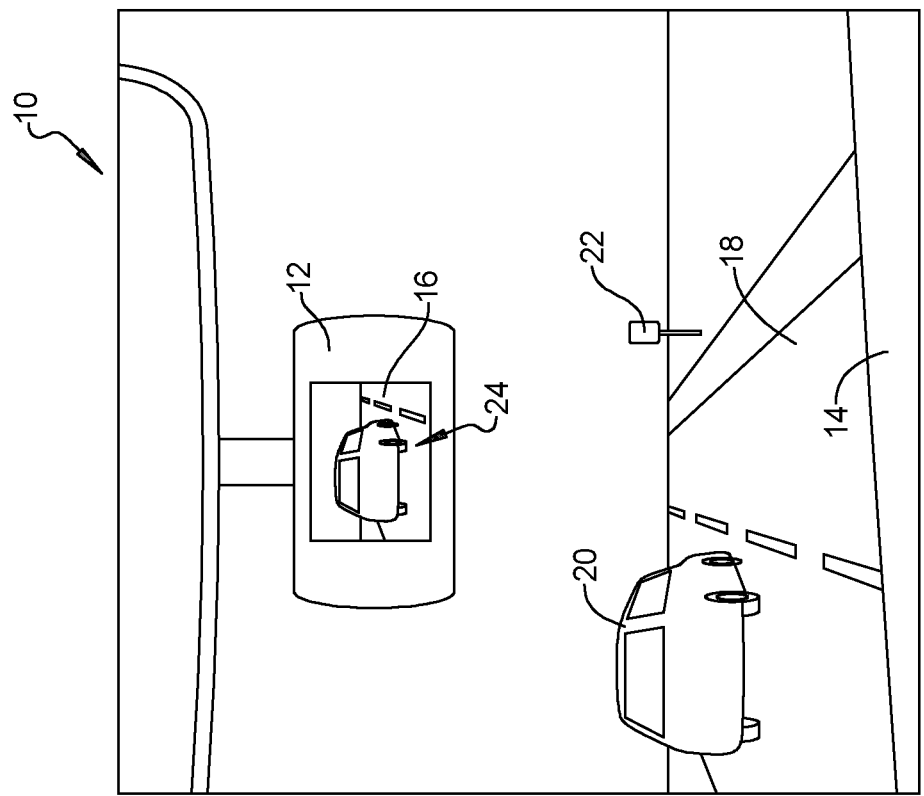
FIG. 1 is front elevational view looking forward of a road sign interpretation system according to an exemplary aspect.

Referring to FIG. 1, a road sign interpretation system 10 includes a camera 12 provided in or on a vehicle 14 such as an autonomous vehicle, a battery electric vehicle, a gasoline engine automobile vehicle, a truck, a van, a sport utility vehicle, or the like. The camera 12 may be any type of color camera and is forward or front-facing to receive a data set having image data 16 including data defining a roadway 18 upon which the vehicle 14 is traveling on and toward, data of one or more other vehicles 20 also on the roadway 18, and data of at least one road sign 22 providing information to an occupant or operator of the vehicle 14 related to the roadway 18. According to several aspects, the data set of the image data 16 received by the camera 12 may be live displayed on a screen 24 of the camera 12 or displayed in a similar display provided in the vehicle 14.

The road sign interpretation system 10 utilizes an on-board computer 26 which is programmed to operate and perform a method of operating the road sign interpretation system 10. The on-board computer 26 receives the image data 16 noted above from the camera 12, as well as other data such as data saved and retrieved from a memory 28 to perform road sign interpretation and to generate and display data results. The on-board computer 26 described in reference to FIG. 1 is programmed to perform operations related to a system and method to collect image data and interpret road signs for the road sign interpretation system 10. The on-board computer 26 is a non-generalized, electronic control device having a preprogrammed digital controller or processor, the memory 28 or a similar non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code. According to other aspects, the computer 26 may be positioned off-vehicle, including in a remote computing station or in the cloud.

Referring to FIG. 2 and again to FIG. 1, the camera 12 of the road sign interpretation system 10 receives the image data 16 from the camera 12. The image data 16 is compared to common road sign text saved in and retrieved from the memory 28 of the on-board computer 26, including for example road sign text such as "one-way" text 30 from a road sign 32. A fixed size feature vector of the common road sign text saved in the memory 28 is compared to a fixed size feature vector of text collected by the camera 12. Individual fixed size feature vectors define an adjustable hyperparameter that may be varied based on a quantity of sign categories. According to several aspects, the road sign interpretation system 10 is further able to receive, save and interpret more complex signs and sign data, such as a "road will be closed" text image 34 presented as a digital image on an electronic, digital sign 36, whose text may also be periodically changed as necessary to suit changing roadway conditions, construction and changing conditions affecting the roadway including weather, visibility, and accident conditions.

Figure 2:
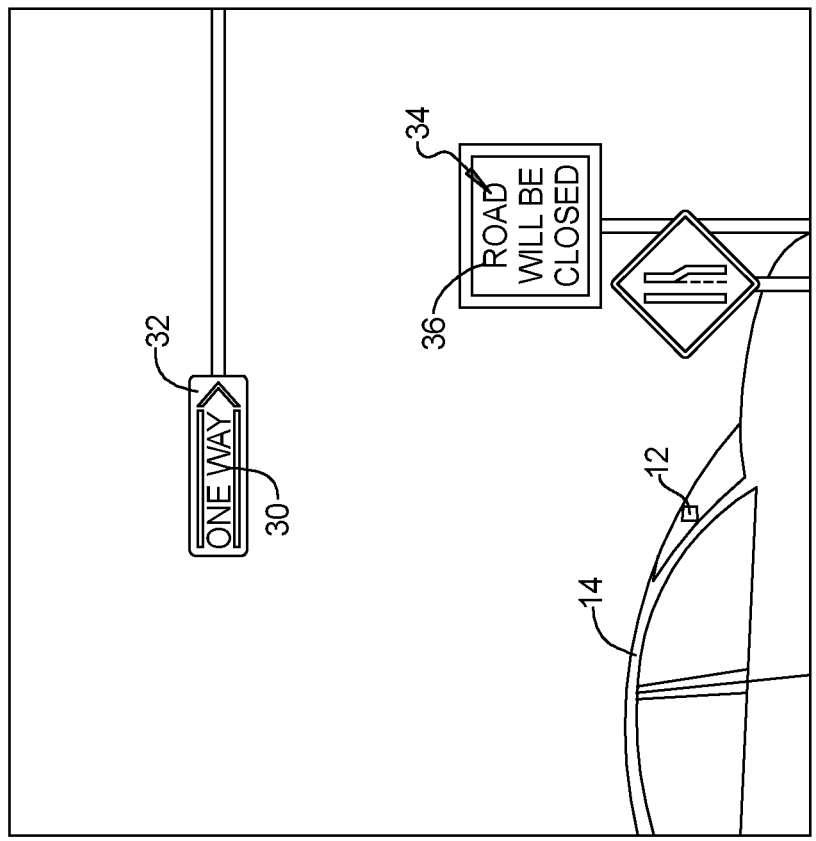
FIG. 2 is a side elevational view of an exemplary roadway traveled by a vehicle using the road sign interpretation system of FIG. 1.

Referring to FIG. 3 and again to FIGS. 1 and 2, the system and a method of operation of the road sign interpretation system 10 is provided using computer vision, natural language text processing (NLP) and planning. The road sign interpretation system 10 provides for six steps, and the method is performed in six steps. In a first step (1) the image data 16 discussed above in reference to FIG. 1 is collected from the front-facing camera 12 mounted on or in the vehicle 14, which provides an egocentric perspective 38 defining objects visible to the vehicle 14 as a first-person point of view. The road sign interpretation system 10 initially detects a generic shape of an exemplary sign 40 and one or more text instances 42 defining text tokens of the sign 40 without any notion of specific sign classes.

In a second step (2) the collected image data 16 from the front-facing camera 12 is fed into a first convolutional neural network (CNN) 44 that yields a set of sign predictions such as one or more sign instances 46, and in parallel the image data 16 collected from the front-facing camera 12 is also fed into a second CNN 48 defining a text extractor that extracts text candidates including the text instances 42. The text extractor of the second CNN 48 accepts entire images as input, which locates the text instances 42 using a fully convolutional neural network as the second CNN 48. It is noted the second CNN 48 is applied as a segmentation network, in lieu of one that yields bounding boxes.

In a third step (3) precise sign and sign data localization is provided for the second CNN 48 to compute a proper text location 50 in the text instances 42. The text location 50 in the text instances 42 is fed from the second CNN 48 into an optical character recognizer (OCR) 52 which includes a character recognition algorithm 54. Using the character recognition algorithm 54 the OCR 52 uses the text location 50 of the text instances 42 of one or more digitized forms 56 that are machine-readable, for example as strings of the text instances 42 for the computer 26 to extract. In the OCR 52 individual text instances 42 are also constructed to form a model with a long short-term memory (LSTM) architecture to support an ordered sequence of outputs, for example, characters into words. Naive string matching-based approaches will not fit the scalability requirement for the road sign interpretation system 10, because it is impractical to enumerate all possible word choices for road signs, therefore in the third step the digitized forms 56 are taken as an input and an output 58 defines a specific sign text.

In a fourth step (4) individual sign instances 46 from the first CNN 44 and individual ones of the text instances 42 in the digitized forms 56 from the OCR 52 are together fed into a sign text synthesizer module 60. The sign text synthesizer module 60 evaluates a text-sign membership including whether or not sign text lies within a bounding region of one of the sign instances 46 such as a sign bounding box 62. The sign text synthesizer module 60 also rearranges and configures the detected sign text into a logical reading order, including for example left-to-right and top-to-bottom as individual text instances or as synthesized text instances 64. For example, "Physician Parking" and "Doctors only" consist of entirely different strings, but both refer to the same parking guideline/instruction of sign category. To address this challenge, a text processing component is developed that enables semantic understanding of the detected sign text.

To determine text ordering, a first computation determines two-dimensional eigenvectors of individual ones of the text instances 42 using <x,y> coordination that form segment contours. X-directional eigenvectors are then extended to form line segments, such that line segment endpoints intersect inside the corresponding sign bounding box. If any two-or-more line segments intersect, the corresponding text is appended to a list and reordered by an increasing <x> position, which determines left-to-right text ordering. If multiple text lines exist within a sign instance, they are ordered by an increasing <y> position, which determines top-to-bottom text ordering.

A sign text synthesizer 66 of the sign text synthesizer module 60 gathers outputs from the first CNN 44, the second CNN 48, and the OCR 52 and synthesizes the outputs into a unifying structure. Specifically, the sign text synthesizer module 60 determines text-sign membership and governs text ordering such as left-to-right and top-to-bottom. To determine sign-text membership, an overlapping region is computed between the text instances 42 and the sign bounding boxes 62. If an exemplary text instance 42 is fully encapsulated by the sign bounding box 62, the exemplary text instance 42 is assigned a member of the corresponding sign such as the exemplary sign 40.

In a fifth step (5) the text instances 42 are fed into a semantic encoding and interpretation module 68 to identify high-level semantics of the detected road signs. Specifically, individual ones of the text instances 42 are first encoded as fixed-dimension feature vectors 70 using the semantic encoding and interpretation module 68. Subsequently, individual sign categories 72 are automatically classified as one of the possible road sign categories, for example "no parking" or "detour", based on the semantics captured as the feature vectors 70.

Each detected text instance is first fed into a sentence encoder to obtain a numeric feature representation that captures its semantics. A Universal Sentence Encoder (USE) or any other sentence encoder is leveraged to generate a fixed-length feature vector for each text instance 42. Individual text instances 42 are converted into a data point in a fixed size space. A calculation may then be performed determining how close or distant two points, such as two text instances 42 are, using any desired distance metrics, for example a Euclidean, or a Dot product. The USE permits measuring a semantic relatedness between text instances, despite them being expressed in different ways.

In a sixth step (6) defining a leveraging and sign context identification step, a planner 74 defining a portion of a navigation router 76 receives an output of the semantic encoding and interpretation module 68 and computes a route plan, which is fed to the navigation router 76. Using the route plan the navigation router 76 recommends a route for the vehicle 14 to take which optimizes travel time and distance for navigation. The navigation router 76 communicates the recommended route to a map 78 which identifies and presents the recommended route with updated path constraints to the vehicle operator for the route recommended to be taken.

Based on the latest sign context, the navigation router 76 updates the plan and recommends a new route to the vehicle 14 for navigation guidance including optimizing travel time and distance. Specifically, the navigation router 76 generates routes from a start point to an endpoint. The navigation router 76 may for example use Dijkstra's algorithm to route the vehicle 14 through the map 78, which is represented as a graph whose nodes represent intersections and whose edges represent roads.

Figure 4:
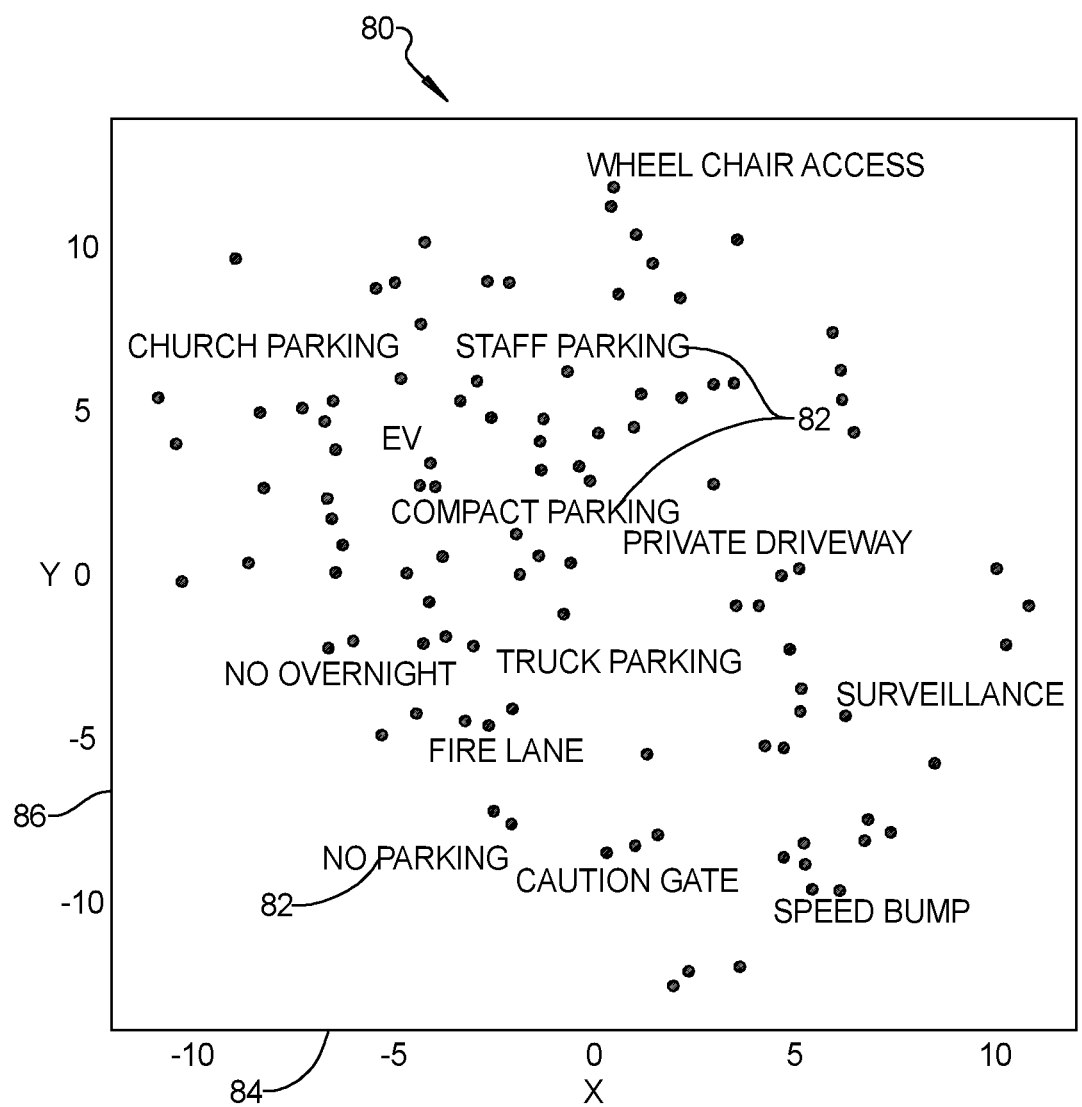
FIG. 4 is a 2D visualization graph presenting exemplary encodings of multiple 125 sign text instances used by the road sign interpretation system of FIG. 1.

Referring to FIG. 4, a 2D visualization graph 80 presents individual dots representing text instances and encodings of exemplary categories of signs 82 collected from 25 sign categories on an exemplary parking sign website, for example 5 samples each, presented with respect to an x-axis 84 and a y-axis 86. The 2D visualization may use a t-Distributed Stochastic Neighbor Embedding (T-SNE) technique that projects the high dimension feature vectors to a 2D space. T-SNE defines a technique or any other dimension reduction technique visualizing high dimensional data by giving each point a location in a two or three-dimensional map. The T-SNE technique is a Stochastic Neighbor Embedding (SNE) variation. Semantically related text instances are localized in the USE encoding space.

Figure 5:
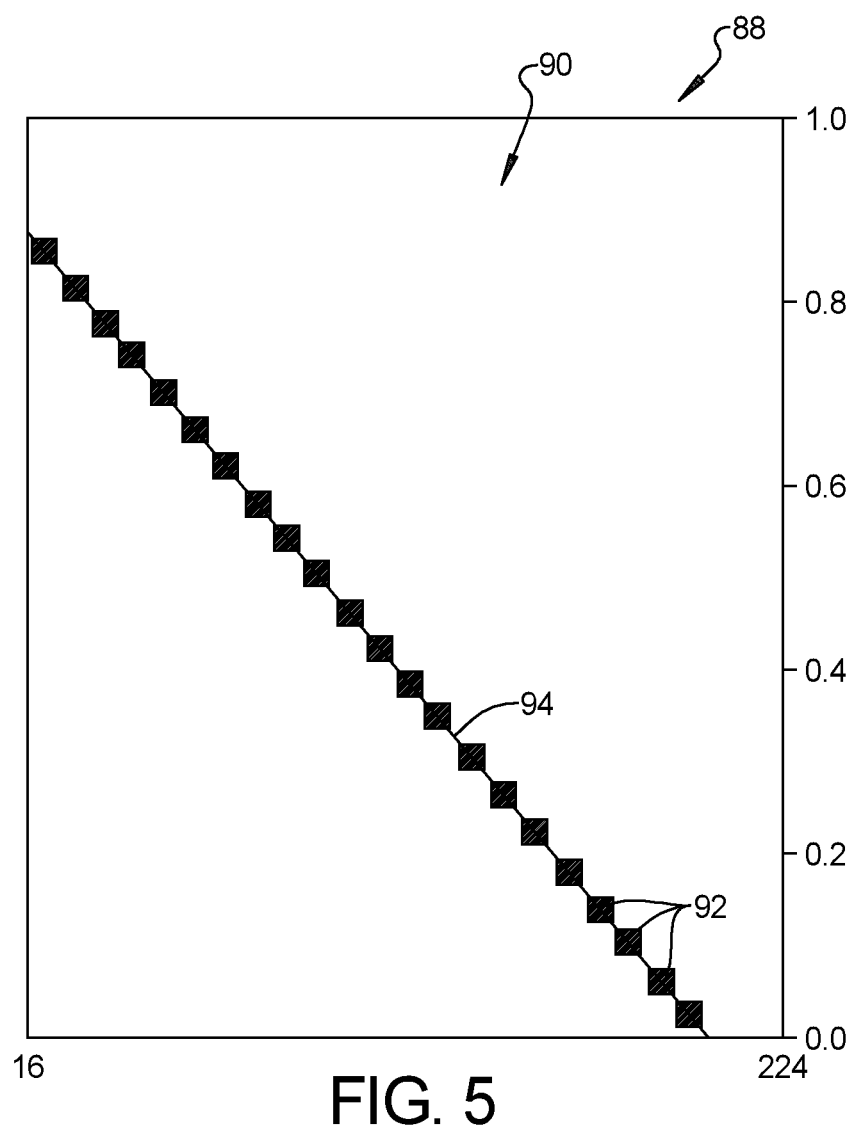
FIG. 5 is a graph presenting pairwise distances in a semantic encoding space using a dot product of the USE feature vectors among the 125 sign text instances discussed in reference to FIG. 4.

Referring to FIG. 5, a graph 88 presents pairwise distances in a semantic encoding space 90 using a dot product of the USE feature vectors among the 125 sign text instances discussed in reference to FIG. 4. Strong within-class similarities are observed, as shown in multiple exemplary squares 92 along a diagonal 94. Given an unseen text instance such as "Smile. You are on Camera", a USE feature representation is computed and then its nearest neighbor in the encoding space 90 is identified.

Figure 3:
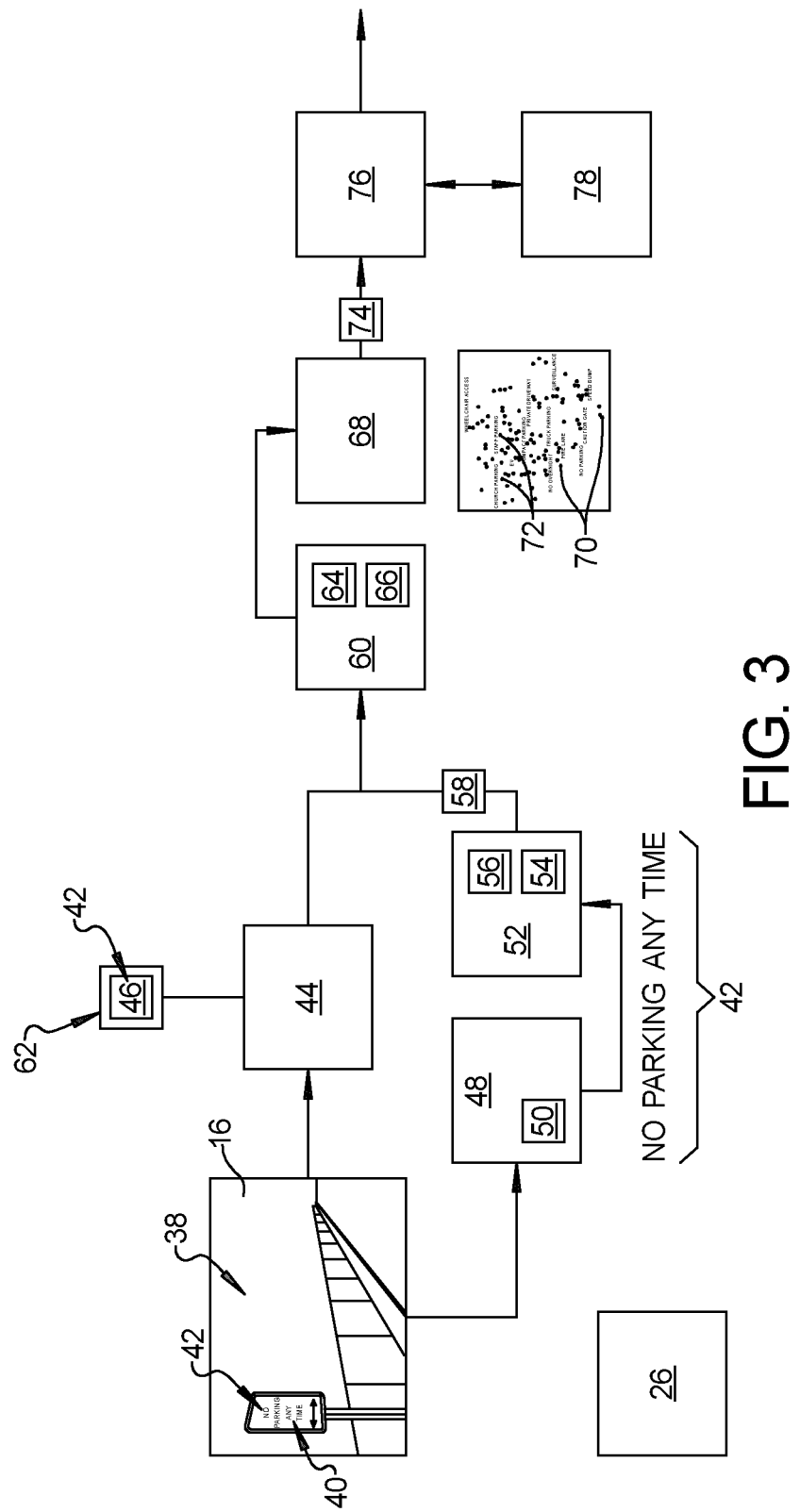
FIG. 3 is a flow diagram of system components and method steps for operating the road sign interpretation system of FIG. 1.

With continuing reference to FIGS. 3 and 5, an output from the semantic encoding and interpretation module 68 may also be used as an input to the navigation router 76. For example, if an encountered sign is classified as "Detour Ahead", the navigation router 76 places a blockage ahead of the vehicle 14 on the map 78 to remove that path from its routing options.

Figure 6:
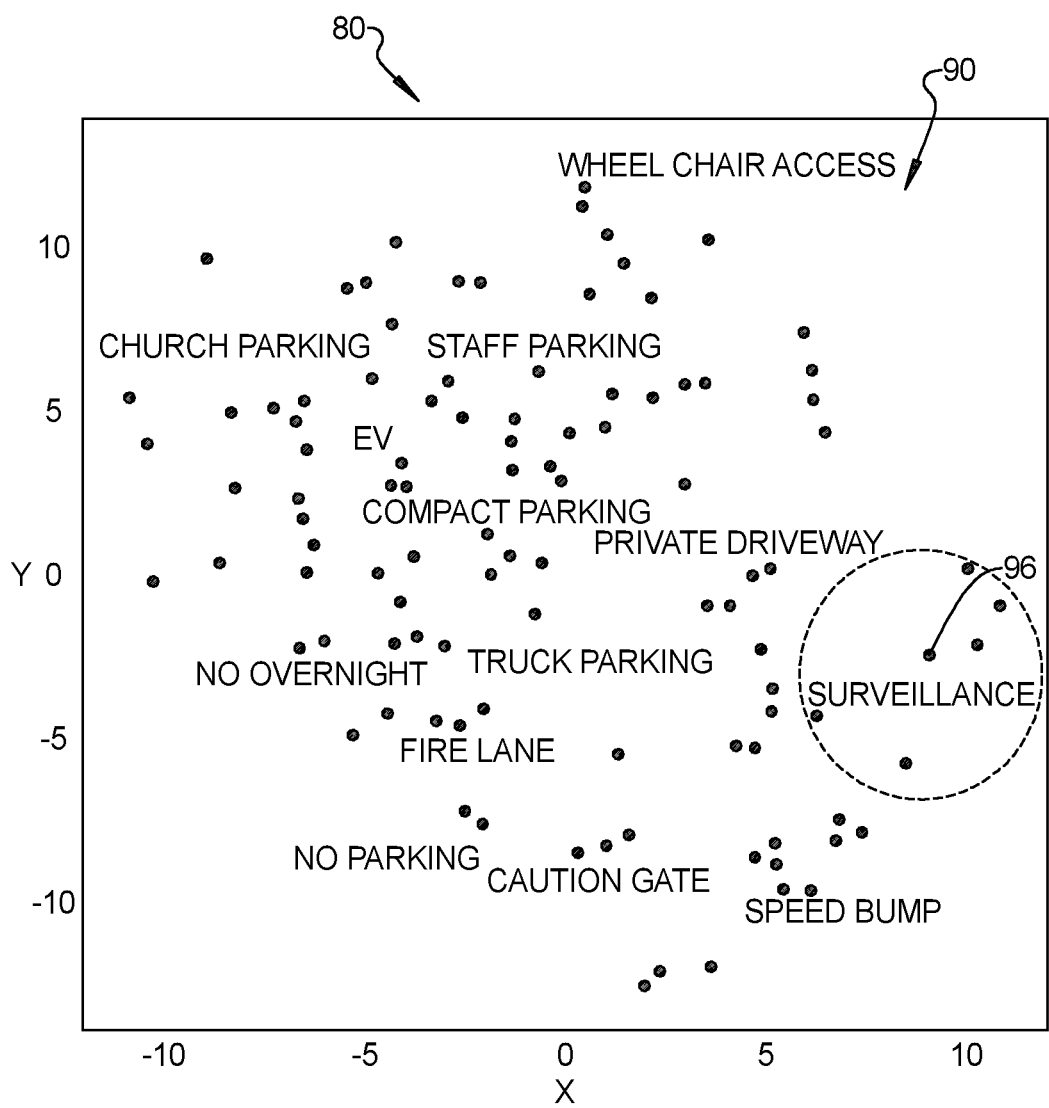
FIG. 6 is a 2D visualization graph modified from FIG. 5.

Referring to FIG. 6 and again to FIG. 5, a location of a new string 96 is shown in the semantic encoding space 90 of the 2D visualization graph 80. The new string 96 is near the other text instances in the video surveillance category, despite different wordings and expressions.

Figure 7:
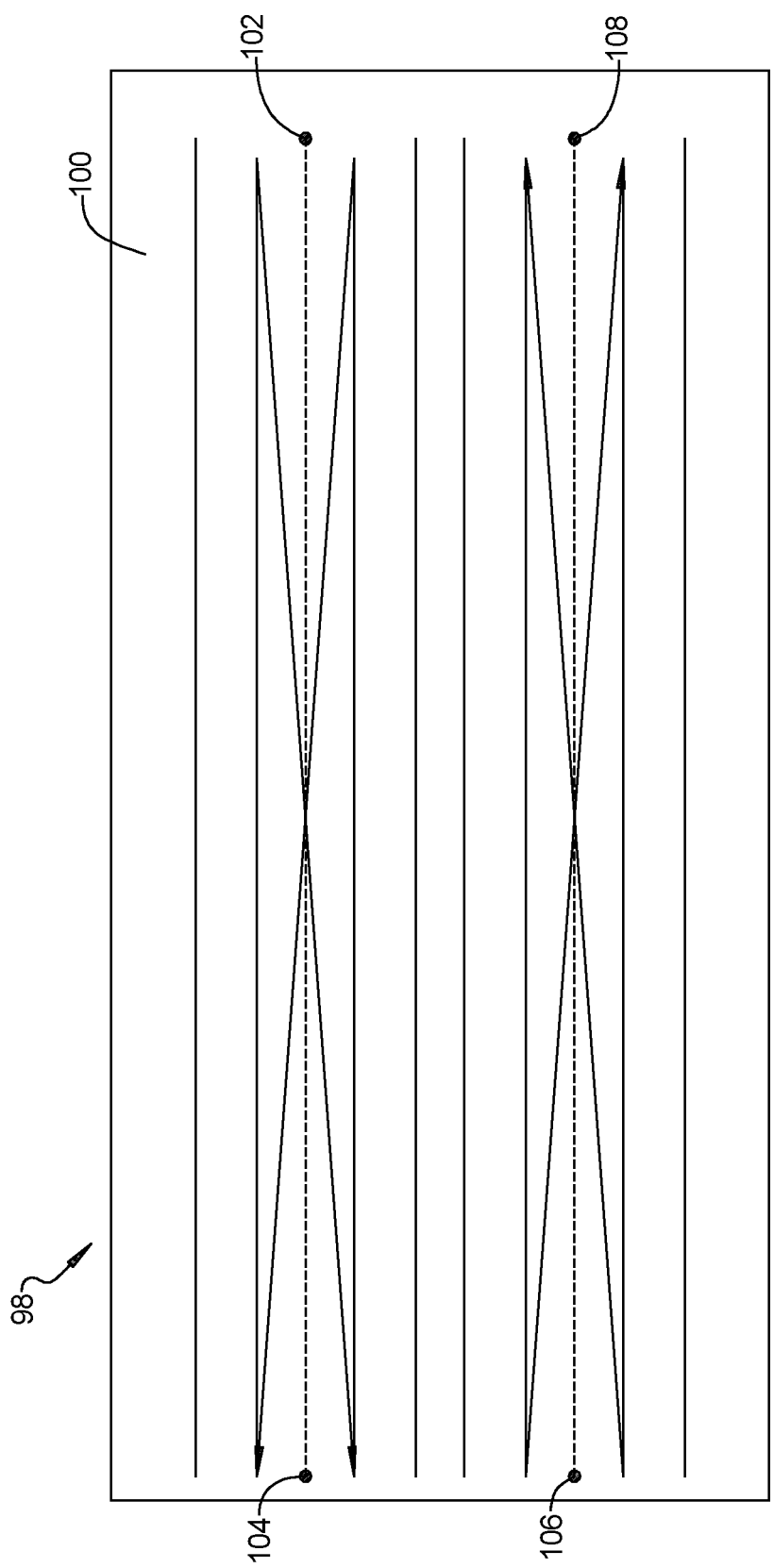
FIG. 7 is a bipartite graph presenting an illustration of an exemplary road segment.

Referring to FIG. 7, a bipartite graph 98 presents an illustration of a road segment 100 which includes a first start point 102 and a first end point 104 and a second start point 106 and a second end point 108 of the road segment 100. The bipartite graph 98 may be constructed for each side of the road segment 100 based on the first start point 102 and the second end point 108. The navigation router 76 can accept blockage locations as inputs to update the bipartite graph 98 and redirect traffic around those blockages. With continuing reference to FIGS. 3 and 7, the navigation router 76 may also accept messages that increase a routing cost, or "weight," associated with a particular edge on the graph 98. For example, if the semantic encoding and interpretation module 68 classifies the sign as "Construction Ahead", the navigation router 76 adds an increased routing weight to the road segment 100 ahead of the vehicle 14.

The road sign interpretation system 10 performs sign detection using a convolutional neural network. Sign detection is performed using a single-stage network, meaning that sign instances such as their locations and classes are extracted by passing an entire image through a single network. This achieves rapid detection, in contrast to traditional techniques, where only individual regions of an image are fed through a network. To achieve scalability the road sign interpretation system 10 extracts generic sign text and sign text semantics rather than specific sign classes. The system and method used by the road sign interpretation system 10 is therefore not limited by the kinds of signs detected, but instead extracts sign-like regions, characterized by bounding box locations and a corresponding prediction confidence score.

The road sign interpretation system 10 of the present disclosure includes a monocular camera and software components that detect and reason about arbitrary road signs to support vehicle driving such as autonomous vehicle driving. The road sign interpretation system 10 detects road signs in a scalable manner, while also translating its percepts into a set of purposeful actions. The road sign interpretation system 10 is applicable to autonomously driven vehicles, and enables autonomous vehicles to navigate real-world scenarios, particularly those that are unexpected and challenging, such as construction zones, road closures and accidents.

A road sign interpretation system 10 of the present disclosure offers several advantages. These include scalable road sign detection to address uncommon or unique road signs. Low-level and high-level interpretation/reasoning capabilities are provided. The system provides the ability to translate visual information into a set of actions. Capabilities for autonomous vehicles to handle uncommon or unexpected situations are also provided as well as improved planning and navigation for autonomous vehicles The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A road sign interpretation system, comprising:
a camera mounted on or in a vehicle, the camera collecting a data set having image data of multiple road signs;
a first convolutional neural network (CNN) receiving the image data from the camera and yielding a set of sign predictions including multiple sign instances;
a second CNN defining a text extractor receiving the image data from the camera and extracting text candidates including multiple text instances;
a text location from the multiple text instances computed in the second CNN to provide sign and sign data localization;
a sign text synthesizer module receiving individual sign instances of the multiple sign instances from the first CNN and individual ones of the multiple text instances in digitized forms from an optical character recognizer (OCR) wherein the sign text synthesizer:
evaluates a text-sign membership including whether or not sign text lies within a bounding region of one of the sign instances;
rearranges and configures the sign text instances into a logical reading order, including left-to-right and top-to-bottom as individual text instances or as synthesized text instances by determining two-dimensional eigenvectors of individual ones of the text instances using <x,y> coordination that form segment contours, x-directional eigenvectors are then extended to form line segments, such that line segment endpoints intersect inside the corresponding sign bounding box, and when any two-or-more line segments intersect, the corresponding text is appended to a list and reordered by an increasing <x> position, which determines left-to-right text ordering, and when multiple text lines exist within a sign instance, they are ordered by an increasing <y> position, which determines top-to-bottom text ordering; and determines sign-text membership by computing an overlapping region between the text instances and the bounding region of the sign instance, wherein when the text instance is fully encapsulated by the bounding region, the text instance is assigned a member of the corresponding sign instance; and a semantic encoding and interpretation module receiving the multiple text instances and identifying semantics of the multiple road signs by feeding each text instance into a Universal Sentence Encoder (USE) to generate a fixed-length feature vector for each text instance that is based on semantic features, converting the fixed-length feature vector into a data point in a fixed size space, and calculating how close or distance two data points representing two different text instances are in order to measure a semantic relatedness between the two different text instances.

2. The road sign interpretation system of claim 1, wherein the multiple text instances include a text order, and further including a character recognition algorithm provided with the OCR, the character recognition algorithm converting the text order of the multiple text instances into one or more machine-readable digitized forms.

3. The road sign interpretation system of claim 2, including:
a planner receiving an output of the semantic encoding and interpretation module;
a route plan computed by the planner; and
a navigation router receiving the route plan.

4. The road sign interpretation system of claim 1, wherein the camera defines a front-facing camera, and further including an on-board computer receiving the image data from the front-facing camera, in addition to data saved and retrieved from a memory of the on-board computer to perform road sign interpretation and to generate and display data results.

5. The road sign interpretation system of claim 4, including common road signs having images saved in and retrieved from the memory of the on-board computer, wherein the front-facing camera receives the image data which is compared to the images of the common road signs.

6. The road sign interpretation system of claim 1, including an egocentric perspective defining objects visible to the vehicle as a first-person point of view provided by the camera.

7. The road sign interpretation system of claim 1, wherein the text extractor of the second CNN accepts entire ones of the image data of the multiple road signs as input, and the second CNN is applied as a segmentation network.

8. The road sign interpretation system of claim 1, wherein individual text instances identified by the OCR are constructed to form a model having a long short-term memory (LSTM) architecture to support an ordered sequence of outputs including characters into words.

9. A method to interpret road signs, comprising:
collecting a data set having image data from a front-facing camera mounted on or in a vehicle including text data of multiple road signs;
applying the image data received by the front-facing camera in a first convolutional neural network (CNN) to yield a set of sign predictions including one or more sign text instances, and in parallel forwarding the image data received by the front-facing camera into a second CNN defining a text extractor to extract text candidates including multiple sign text instances;

providing sign and sign data localization for the second CNN to compute a text location from the multiple sign text instances;
transferring individual sign instances from the first CNN and individual ones of the multiple sign text instances in digitized forms from an optical character recognizer (OCR) into a sign text synthesizer module, wherein the sign text synthesizer:
evaluates a text-sign membership including whether or not sign text lies within a bounding region of one of the sign instances;
rearranges and configures the sign text instances into a logical reading order, including left-to-right and top-to-bottom as individual text instances or as synthesized text instances by determining two-dimensional eigenvectors of individual ones of the text instances using <x,y> coordination that form segment contours, x-directional eigenvectors are then extended to form line segments, such that line segment endpoints intersect inside the corresponding sign bounding box, and when any two-or-more line segments intersect, the corresponding text is appended to a list and reordered by an increasing <x> position, which determines left-to-right text ordering, and when multiple text lines exist within a sign instance, they are ordered by an increasing <y> position, which determines top-to-bottom text ordering; and
determines sign-text membership by computing an overlapping region between the text instances and the bounding region of the sign instance, wherein when the text instance is fully encapsulated by the bounding region, the text instance is assigned a member of the corresponding sign instance; and
feeding the individual ones of the multiple sign text instances into a semantic encoding and interpretation module to identify high-level semantics of the multiple road signs by feeding each text instance into a Universal Sentence Encoder (USE) to generate a fixed-length feature vector for each text instance that is based on semantic features, converting the fixed-length feature vector into a data point in a fixed size space, and calculating how close or distance two data points representing two different text instances are in order to measure a semantic relatedness between the two different text instances.

10. The method of claim 9, further including:
forwarding an output of the semantic encoding and interpretation module to a planner; and
operating the planner to compute a route plan and feeding the route plan to a navigation router.

11. The method of claim 10, further including:
recommending a route for the vehicle to take that optimizes travel time and distance for navigation using the navigation router; and
communicating the route to a map which identifies and presents the route including updated path constraints to a vehicle operator.

12. The method of claim 9, further including detecting a generic shape of an exemplary sign and one or more of the multiple sign text instances defining text tokens of the sign.

13. The method of claim 9, further including applying a character recognition algorithm of the OCR to convert a text order of the multiple sign text instances into one or more digitized forms that are machine-readable.

* * * * *